Leopold F. Schmid
INVENTOR.

BY Karl G. Ross
ATTORNEY

Leopold F. Schmid
INVENTOR.

BY Karl F. Ross
ATTORNEY

L. F. Schmid
INVENTOR.
BY
Karl F. Ross
ATTORNEY

Leopold F. Schmid
INVENTOR.

BY Karl F. Ross
ATTORNEY

United States Patent Office 3,435,922

Patented Apr. 1, 1969

3,435,922

HYDRAULIC DISK BRAKE WITH AUXILIARY BRAKE-OPERATING MECHANISM OPERABLE FROM ONE SIDE OF THE DISK

Leopold Franz Schmid, Stuttgart, Germany, assignor to Alfred Teves G.m.b.H., Frankfurt am Main, Germany, a corporation of Germany Continuation-in-part of application Ser. No. 567,740, July 25, 1966. This application Dec. 20, 1967, Ser. No. 692,175

Claims priority, application Germany, Dec. 28, 1966, T 32,873

Int. Cl. F16d 65/14, 55/00; B60t 11/10

U.S. Cl. 188—106 14 Claims

ABSTRACT OF THE DISCLOSURE

A disk-brake assembly having auxiliary brake actuating means for emergency, parking or locking purposes and mechanically operated by a Bowden line from the operator's seat of the vahicle in which the housing is provided with, in addition to main wheelbrake pistons which urge respective brakeshoes against the disk, a pair of auxiliary pistons in respective auxiliary cylinders whose axes are parallel to the axes of the main pistons and cylinders and which are connected by a fluid passage behind the auxiliary pistons while a plunger is operated from one side of the disk by the Bowden cable to increase the pressure behind the auxiliary pistons and urge at least one of them in the direction of the disk to apply a brakeshoe thereagainst. The plunger thus acts as a servo-master which can operate one or both auxiliary pistons as servo followers. Preferably, each auxiliary piston urges a respective brakeshoe against the disk directly or via force-transmitting means.

This application is a continuation-in-part of my copending application Ser. No. 567,740, filed July 25, 1966.

My present invention relates to a disk-brake arrangement having a brake-actuating mechanism operable from one side of the brake disk to urge brakeshoes on the opposite sides of the disk against the annular braking faces of the latter and, especially, to a manually operable mechanism of this character.

In my copending application mentioned above, I have described and claimed an auxiliary brake mechanism for disk brakes which may be used as a hand brake, emergency brake or wheel-locking brake of an automotive vehicle, this auxiliary brake being actuatable by the operator independently of the main hydraulic system used to apply the brakes during vehicle travel. In automotive vehicles and the like, it is a common practice to provide such auxiliary actuating devices for one or more wheel brakes for use in parking the vehicle and for emergency operation of the wheel brakes in the event of failure of the normal hydraulic system. Such auxiliary actuating systems are commonly known as hand brakes since they are often actuated by a lever shiftable by the hand of the operator of the vehicle. It will be understood, however, that reference hereinafter to a "handbrake system" is intended to include other means of actuating the auxiliary mechanism, namely, pedals, levers or the like which may or may not be operated directly by hand but are in most cases mechanical linkages between an actuating member adjacent the operator's seat in the vehicle and an operated member at one or more of the wheel brakes. Present systems generally make use of auxiliary actuating devices for drum-type brakes whereby a cable or other force-transmitting mechanism swings a lever which, in turn, bears upon one or both shoes of one of the internal-expanding brake arrangements at a rear wheel of the automotive vehicle. Similar lever arrangements cannot be employed effectively with disk-type brakes wherein the brakeshoes are shiftable in or with respect to yoke-type support arrangements in a direction perpendicular to the braking surface of the disk and parallel to its axis of rotation.

The term "disk brake" is used herein (and generally in the automotive field) to refer to a brake system in which, by contrast with so-called internal expanding brakes using a drum-like rotary brake surface, a disk constitutes the rotating member of the brake arrangement. More specifically, a disk brake generally comprises a rotating brake disk having a hub which is connected with the wheel disk (when the disk brake is used as a vehicular wheel brake) and an outwardly extending annular flange whose opposite surfaces form annular braking faces which lie in planes transverse to the axis of rotation of the wheel and the disk. The stationary brake member is generally a yoke or housing mounted upon the vehicle chassis or some other part of the vehicle which is stationary with reference to this axis of rotation. Thus the brake yoke may have a flange which is bolted to the axle housing associated with the wheel.

The yoke extends about the periphery of the disk although enclosing only a limited segment thereof and has lobes lying on opposite sides of the disk in which respective brakshoes are juxtaposed with the annular braking faces of the disk. The brakeshoes may be urged against the disk by respective pistons slidable in wheel-brake cylinders formed by the lobes, the pistons being movable perpendicularly to the annular braking faces of the disk. The pistons bear against rigid (e.g. steel) backing plates of the brakeshoes to bring the brake linings which are bonded to these plates into frictional engagement with the opposite flanks of the disk. The yoke thus forms a guide for the brakeshoes preventing their rotatable entrainment with the disk.

As pointed out in the aforementioned copending application, efforts have been made to apply lever systems of the character described to disk brakes without success, inasmuch as the lever arrangements invariably tend to become relatively complex and expensive and are endangered by contamination with water, dirt, etc. Another disadvantage is that conventional lever systems require considerable space and thus complicate the difficulties of keeping the disk brakes and associated parts free from mechanical defects. In accordance with the principles of the copending application, the disk brake is provided with a pair of brakeshoes displaceable perpendicularly to the annular braking faces of a disk and disposed on opposite sides thereof, a bent channel (e.g. of U-shaped configuration) open at one end in the direction of one of the brakeshoes and having its other end open toward the other side of the disk (e.g. in the region of the other brakeshoe); the auxiliary actuating mechanism includes a member acting directly upon this latter brakeshoe and a compression resistant force-transmitting means running through this channel to bear upon the first-mentioned brakeshoe. The channel which is sealed from the ambient environment, advantageously encloses a plurality of compression-resistant balls forming part of the above-mentioned force-transmitting means and extending around the bight of the channel to bear directly or via a pin against the first-mentioned brakeshoe. The actuating force can be transmitted to the balls via a further pin extending parallel to the axis of the disk and thus perpendicularly to the braking surface thereof. A pair of force-transmitting pins is provided in some embodiments, one of the pins transmitting motion to the balls while the other bears directly against the brakeshoe along the side of the brake support at which the lever mechanism of the actuating device is located. The U-shaped or J-shaped channel is constituted as a tube along which the balls can be displaced with limited play in the radial direction but freely in the longitudinal sense.

In addition to the problems of auxiliary brake operation (solved in part by the system of the aforementioned copending application) discussed above, disk-brake systems with such auxiliary actuating means have been characterized by high spatial requirements and complicated mounting and force-transmitting assemblies which are prone to wear and thus, have limited the utility of the auxiliary mechanisms and have sometimes caused the brake-actuating means to operate with less than maximum effectiveness.

A principal object of the present invention is, therefore, to provide an improved actuating system for a disk-brake assembly which extends principles originally set forth in my copending application mentioned earlier but yet does not increase the bulk or mass of the disk brake to any appreciable extent.

This object and others which will become apparent hereinafter are attained, in accordance with the present invention, in a disk-brake assembly which comprises, in addition to the usual main brakeshoe flanking the disk and urged thereagainst by the main actuating means (e.g. wheel-brake pistons hydraulically displaceable in respective wheel-brake cylinders under the control of a master cylinder operated by the brake pedal), an auxiliary mechanically controlled brake system which comprises a pair of auxiliary pistons mounted in the brake housing for displacement in opposite directions and in respective auxiliary cylinders, preferably in a direction perpendicular to the annular braking faces of the disk, and means for displacing these auxiliary pistons which are hydraulically connected (e.g. by a passage connecting the auxiliary cylinders) such that at least one of these auxiliary pistons acts upon a brakeshoe along a side of the disk opposite that at which the mechanism for shifting these auxiliary pistons is provided. In other words, the present invention comprises a mechanically actuatable emergency, parking or locking brake arrangement using a pair of auxiliary brakeshoes or the main brakeshoes, but affording mechanical actuation of the brakeshoes independently of the hydraulic actuation of the main wheel brake pistons, although the emergency brake may always function concurrently therewith. To this end, the auxiliary actuating mechanism provides a pair of oppositely displaceable auxiliary pistons whose directions of displacement are parallel to one another and which have parallel axes perpendicular to the annular braking faces of the disk and parallel to the direction of displacement of the main brakeshoes. The auxiliary pistons are in force-transmitting relationship via a hydraulic medium filling the auxiliary cylinders behind the pistons, these auxiliary cylinders being interconnected by the aforementioned passage. In addition, each of the auxiliary pistons is associated with a respective brakeshoe and, indeed, is mechanically coupled therewith upon auxiliary brake actuation.

According to a more specific feature of this invention, the auxiliary pistons are operated from only one side of the disk via a lever arrangement or other element controlled from the driver's position in the vehicle. Preferably, the actuating means includes a member shiftable parallel to the axis of the auxiliary pistons, perpendicularly to the annular braking faces of the disk and to the planes of the brakeshoes, and parallel to the axis of rotation of the disk and the axis of the main pistons for pressurizing the force-transmitting fluid interconnecting the auxiliary cylinders. This member may be a push rod or pin (see the aforementioned copending application) bearing upon a servo-master piston (i.e. a first of these auxiliary pistons) to transmit force to a follower (i.e. second) auxiliary piston which, in turn, applies a brakeshoe remote from the side of the disk at which the push rod is provided against the distal side of the disk. In this case, one of the auxiliary pistons forms a plunger in combination with the push rod.

An alternative actuating arrangement provides a plunger displaceable in a variable-volume compartment which communicates with the auxiliary cylinders behind the respective auxiliary pistons in the direction of displacement of the latter for brake operation. Thus, each of the auxiliary pistons may act upon the brakeshoes of the emergency, parking or locking brake and may be supplied with hydraulic fluid from this compartment in which the plunger is displaceable to force fluid to the auxiliary cylinders. In this system, the plunger acts as the servo-master piston and both auxiliary pistons from servo-followers. Still another modification provides the plunger compartment in alignment with the auxiliary cylinder of one of the auxiliary pistons while the other auxiliary cylinder, namely, the cylinder remote from the actuating side of the brake, is connected with the proximal auxiliary cylinder by passages formed in the brake yoke.

As indicated earlier, the brakeshoes applied by the auxiliary pistons against the disk may be the main brakeshoes or an independent pair of auxiliary brakeshoes juxtaposed with the disk at a location offset from the main brakeshoes. In the former case, I prefer to provide the auxiliary pistons in tandem with the respective main pistons so that the auxiliary pistons may act upon the main brakeshoes by pushing the main pistons toward the disk. When one of the auxiliary pistons serves as a servo-master and forms part of the plunger, however, the lever arrangement actuating the plunger may also mechanically urge the proximal main brakeshoe against the disk.

The above and other objects, features and advantages of the present invention will become more readily apparent from the following description, reference being made to the accompanying drawing in which.

Figure 1:
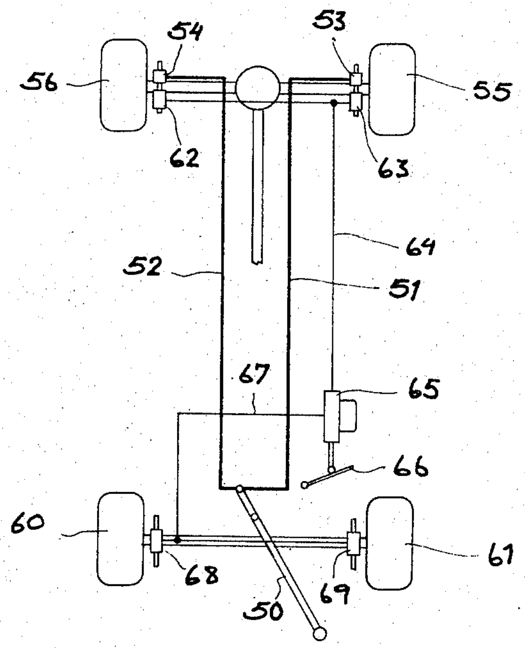
FIG. 1 is a diagram of a vehicular brake system embodying the principles of this invention.

In FIG. 1, I provide a diagrammatic view of the principles of the present invention applied to a vehicular brake system. The front wheels of the vehicle are represented at 60 and 61 while the rear wheels are shown at 55 and 56, respectively. The usual disk brakes 62 and 63 of the rear wheels are connected to a common transmission network 64 delivering brake fluid from a tandem master cylinder 65 to these wheel brakes from one compartment of this master cylinder. The latter cylinder is operated by a brake pedal 66 at the driver's compartment of the vehicle. The dual-network main hydraulic means for operating the wheel brakes also includes a network 67 from the other compartment of the master cylinder which operates the front-wheel disk brakes 68 and 69. For emergency, parking and locking brake purposes, I provide an auxiliary mechanism which includes a lever 50 adjacent the operator's seat which is designed to lock the auxiliary braking device 53 and 54 via Bowden cables 51 and 52 leading to the rear wheels. The auxiliary brakes 53 and 54 are built into the housings of the main disk brakes 62 and 63 as described in connection with the embodiments of FIGS. 2–9.

In all of these embodiments, the wheel-brake arrangement is to be considered one of a number effective to lock the respective disks through the use of the main brakeshoes or a pair of auxiliary shoes mounted adjacent the main brakeshoes as originally described in the aforementioned copending application. While the master cylinder 65 is not represented in FIGS. 2–9, it will be understood that the main brake piston of all of these systems is energized independently of the auxiliary mechanism (although possibly simultaneously therewith) by delivering brake fluid from the master cylinder to the main wheelbrake cylinders behind the respective pistons. The foot-controlled main brake includes a brake yoke, which is stationary with respect to the axis of rotation of the disk, i.e. may be mounted upon the axle housing when the disk is mounted on the wheel shaft, and is operated from only one side of the disk via an actuating member which may be a plunger or may form part of a plunger whose displacement is independent of the displacement of the brake pedal 66.

Additionally, it will be observed that in all embodiments the basic elements of the auxiliary brake mechanism include a pair of oppositely shiftable auxiliary pistons slidable in respective cylinders which are interconnected by a fluid passage which permits force transfer via the fluid in these auxiliary cylinders from one of the auxiliary pistons to the other and/or from the plunger to both auxiliary pistons. The latter, in each case, are shiftable in a direction parallel to their axes perpendicularly to the braking faces of the disk and toward and away from the latter. Furthermore, this movement is linear and the movement of the plunger is linear while the fluid-force transfer provides the necessary direction change. Consequently, in each case, there are no parts which can bind or lock, nor is there a tendency toward wear, contamination or seizure. Furthermore, in the embodiments of FIGS. 2–9, hand-operated levers are shown which are generically represented by the lever 50. Also, the transfer of motion from the Bowden lines to the plunger is represented diagrammatically since any conventional arrangement performing similar functions may be used. The compartment receiving the plunger and the auxiliary cylinders are all of circular cross-section and the diameter of the plunger compartment is smaller than the diameter of the auxiliary cylinders, thereby ensuring increased force with reduced stroke in accordance with the principles of Pascal's law.

Figure 2:
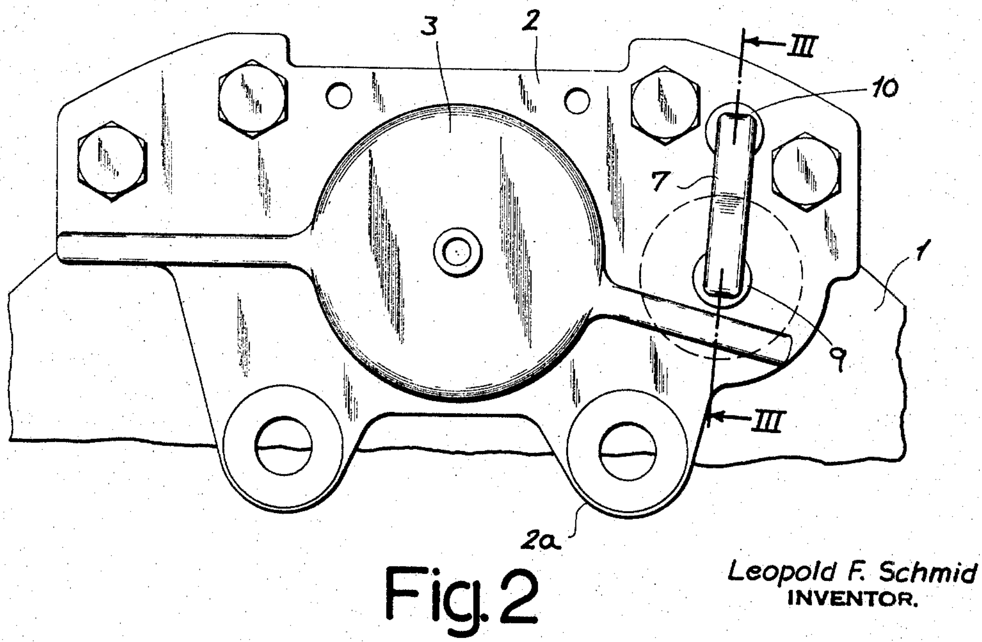
FIG. 2 is a detail view, in elevation, of a brake having auxiliary actuating means in accordance with this invention.
Figure 3:
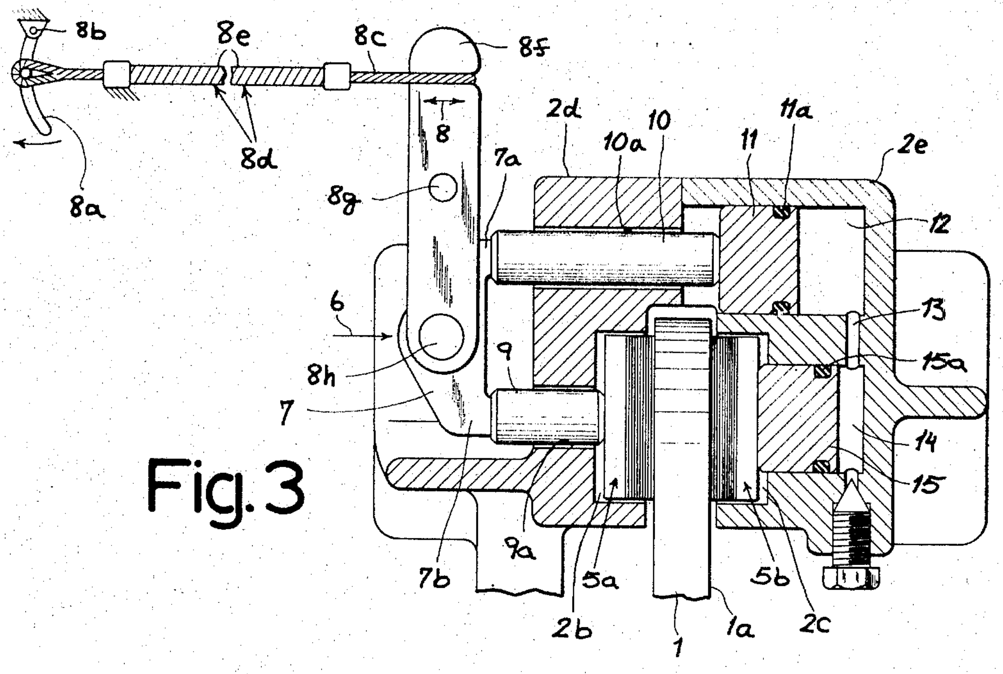
FIG. 3 is a cross-section along the line III—III of FIG. 2.
Figure 4:
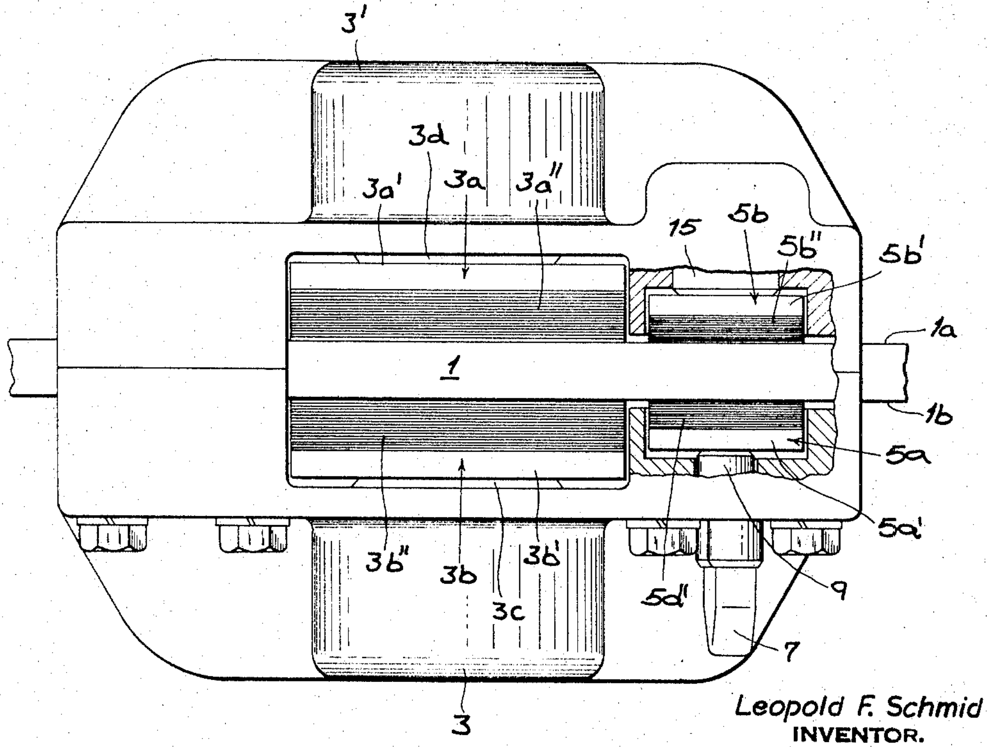
FIG. 4 is a plan view of the device of FIGS. 2 and 3.

From FIGS. 2–4, it can be seen that a disk brake embodying the present invention may comprise a brake yoke 2 having main wheel-brake cylinders 3 and 3' (FIG. 4) to which brake fluid is supplied from a master cylinder in the usual direction. The pistons 3c and 3d within these cylinders form the main brake pistons and bear upon the backing plates 3a' and 3b' of main brakeshoes 3a and 3b which have linings 3a'' and 3b'' juxtaposed with the annular braking faces 1a and 1b of the disk 1. Cylinders 3 and 3' are thus part of the foot-controlled hydraulic brake means operated to slow the vehicle under normal conditions. Adjacent the main brakeshoes 3a and 3b, the housing or yoke 2, which is fixed to the axle housing via a flange 2a, is provided with a pair of auxiliary brakeshoes 5a and 5b which are guided in recesses 2b and 2c of the housing opening in the direction of the braking faces 1a and 1b of the disk 1. These auxiliary brakeshoes, which have areas substantially less than the effective areas of brakeshoes 3a and 3b, also have linings 5a'' and 5b'' confronting the disk and bonded to backing plates 5a' and 5b'. The brakeshoe 5b can be applied against the face 1a of disk 1 via an auxiliary piston 15 whose annular seal 15a slidably engages the wall of an auxiliary cylinder 14 formed in the yoke 2 at a location remote from the actuating (left-hand) side of the disk brake as illustrated in FIG. 3.

Cylinder 14 is connected via a passage 13 parallel to the disk 1 with another auxiliary cylinder 12 in which the piston 11 is axially shiftable, the latter having a sealing ring 11a slidably engaging the wall of cylinder 12. Cylinders 12 and 14 are of circular cross-section and have axes parallel to one another but offset one above the other with respect to the center of rotation of the disk 1. The auxiliary cylinder 12 opens at the junction between the yoke halves 2d, 2e forming the housing and is axially aligned with a bore 10a in the yoke half 2d on the left-hand side of the disk.

A plunger rod 10 is axially shiftable in bore 10a and bears upon the auxiliary piston 11 while forming the plunger of this embodiment together with this piston.

The actuating means also comprises a hand-operated lever 8a which is pivotally mounted at 8b on the vehicle body adjacent the driver's seat. The lever 8a is connected to the core wire 8c of a Bowden cable 8d leading from the driver's compartment to the wheel brake as indicated at 51 or 52 in FIG. 1. The sheath 8e of the Bowden cable is anchored at one end to the body of the vehicle in the usual manner. At its other end, the core wire 8c engages a lever 8f fulcrumed at 8g to the brake housing or some other stationary part of the brake-support assembly, the lever 8f being pivotally raised at 8h to an actuating bridge piece 7 having one arm 7a bearing against the pin or rod 10 and another arm 7b acting upon a pin 9. The latter is shiftable in a bore 9a axially aligned with the auxiliary piston 15 and its cylinder 14 and bearing against the backing plate of the other auxiliary breakeshoe 5a.

The main brakeshoes 3a and 3b are urged against the disk 1 by foot operation of the brake pedal as described in connection with FIG. 1. When, however, it is desired to lock the disk 1 (and the associated wheel) with respect to the yoke 2 (and the associated axle housing), the lever 8a is drawn to the left (clockwise) by the vehicle operator to urge the bridge piece 7 in the direction of arrow 6 via the Bowden line. The member 7 is here shown in an intermediate position and can be displaced to the left and right (FIG. 3) as represented by arrow 8. The bridge 7 bears via arm 7b upon the pin 9 and thus, on the one hand, urges the brakeshoe 5a against the disk 1. Simultaneously, the arm 7b acts via the rod 10 on the auxiliary piston 11 to displace fluid from the auxiliary cylinder 12 via passage 13 into auxiliary cylinder 14 whence the hydraulic force applies the piston 15 against the brakeshoe 5b and urges the latter against the disk. Thus brakeshoe 5a is displaced from left to right while brakeshoe 5b is displaced from right to left to clamp the disk between them.

Figures 5, 6:
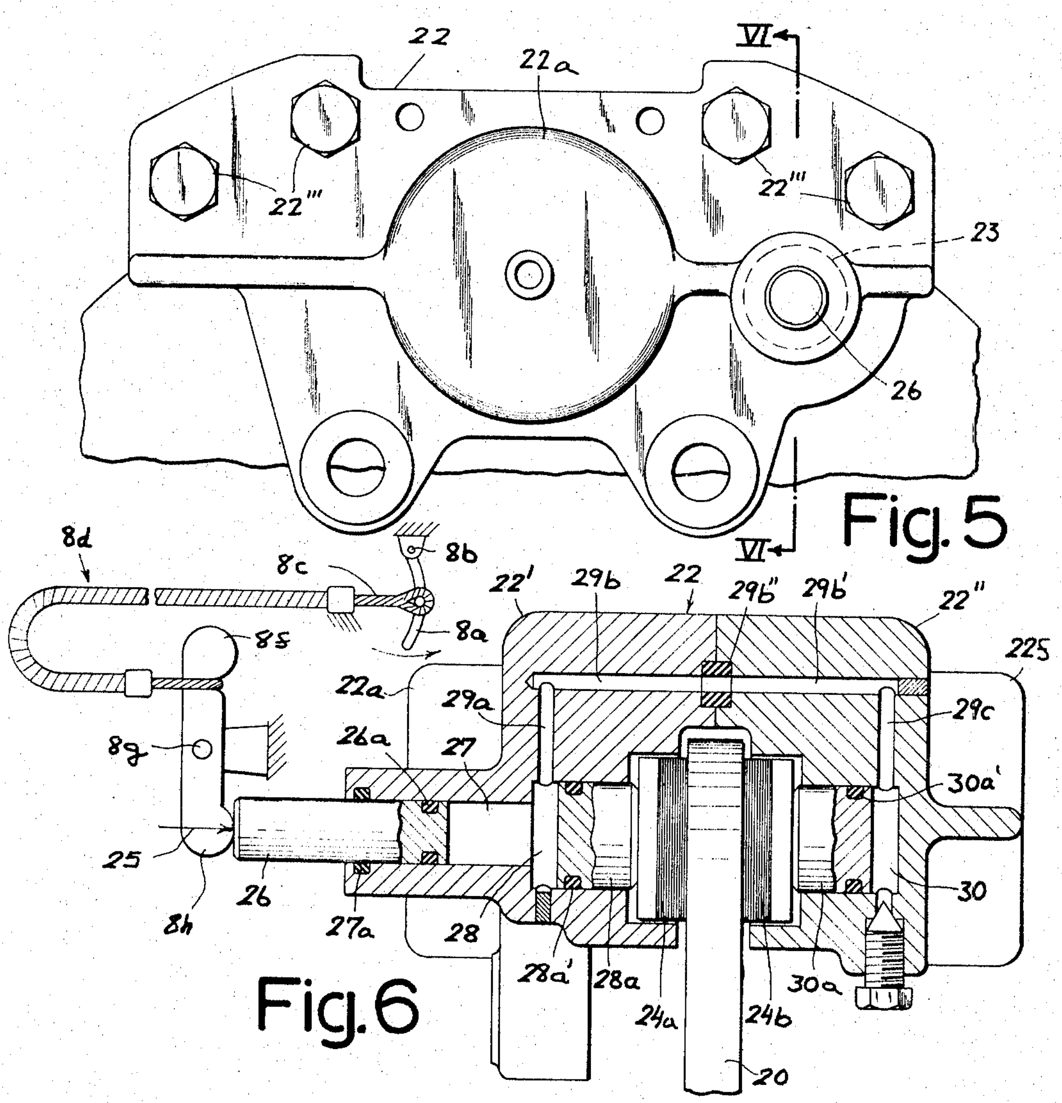
FIG. 5 is a view similar to FIG. 2 of another embodiment.
FIG. 6 is a cross-sectional view along the line VI—VI of FIG. 5.
Figure 7:
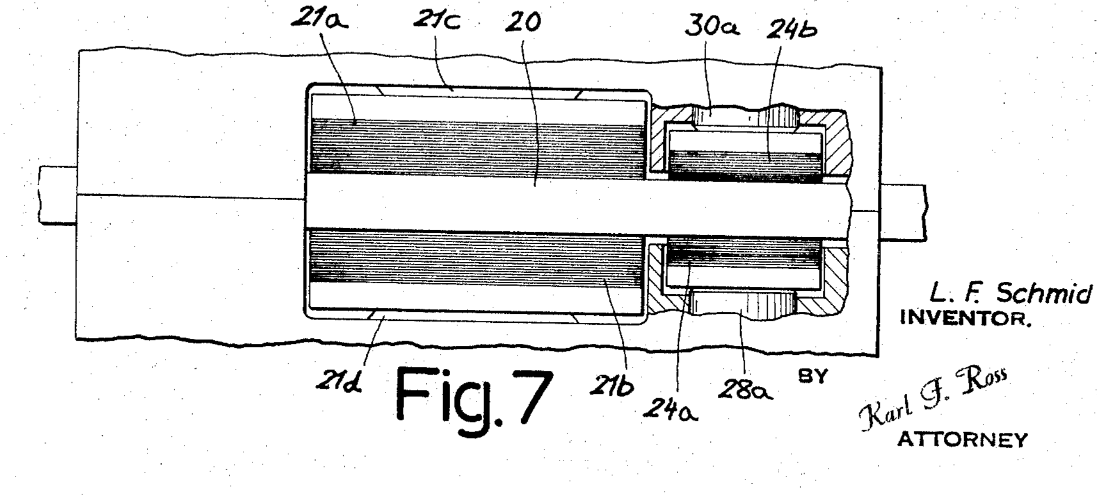
FIG. 7 is a plan view of this brake.

The embodiment of FIGS. 5–7 provides a yoke 22 having a pair of main hydraulic cylinders 22a and 22b which shift main brakeshoes 21a and 21b against the disk 20. The main pistons are represented at 21c and 21d. Adjacent the cylinders 22a and 22b, which are supplied with brake fluid from the master cylinder under the control of the brake pedal (see FIG. 1), I provide a pair of auxiliary brakeshoes 24a and 24b which can be displaced respectively right and left by auxiliary pistons 28a and 30a when the auxiliary mechanism is actuated. In this system, the auxiliary mechanism includes a pair of axially aligned auxiliary cylinders 28 and 30 on opposite sides of the disk 20 and with a common axis parallel to the common axis of the main brake cylinders 22a and 22b. The auxiliary piston 28a and 30a are provided with sealing rings 28a' and 30a' slidably engaging the walls of cylinders 28 and 30.

A Bowden cable 8d has its core wire 8c connected to a lever 8a fulcrumed at 8b to the vehicle body. The core wire is also connected to a lever 8f whose fulcrum 8g is located on a stationary portion of the brake housing. The arm 8h of this lever is designed to shift a plunger 26 in the direction of arrow 25 when the lever 8a is drawn in a counterclockwise direction by the vehicle operator to lock the auxiliary brake, the main brakeshoes being actuated in this system via the brake pedal as indicated earlier.

The plunger 26 is axially shiftable in a compartment formed by a cylinder bore 27 whose diameter is less than the diameter of the auxiliary cylinders 28 and 30 but has a seal 27*a* slidably engaging the plunger whose seal 26*a* engages the wall of the bore 27. In this system (see also FIG. 5) in which the outline of the cylinders 28, 30 is represented by the broken lines 23, the cylinder bore 27 (formed in a boss on the left-hand half of the housing 22) is coaxially aligned with the cylinders 28 and 30 and opens directly into the former. A passage 29*a* parallel to the disk leads from cylinder 28 behind its piston 28*a* to a further passage 29*b*, 29*b'* extending athwart the disk 20. The passage ends 29*b* and 29*b'* are formed in the yoke halves 22', 22'', respectively, and register when the cylinders halves are bonded together at 22''. A sealing ring 29*b''* is interposed between the passages 29*b* and 29*b'* to prevent escape of fluid at the junction between the yoke halves. A further bore 29*c* connects the passage 29*b'* with the interior of cylinder 30 behind piston 30*a*. Thus, displacement of the plunger 26 in the direction of arrow 25 applies pressure to the fluid in compartment 27 and, in accordance with Pascal's law, delivers increased force to the rear side of piston 28 which urges the brakeshoe 24*a* against the disk. Without significant pressure drop, mechanical binding or friction loss, the same pressure is communicated to the auxiliary cylinder behind the piston 30*a* which shifts the auxiliary brakeshoe 24*b* to the left against the disk 20.

Figures 8, 9:
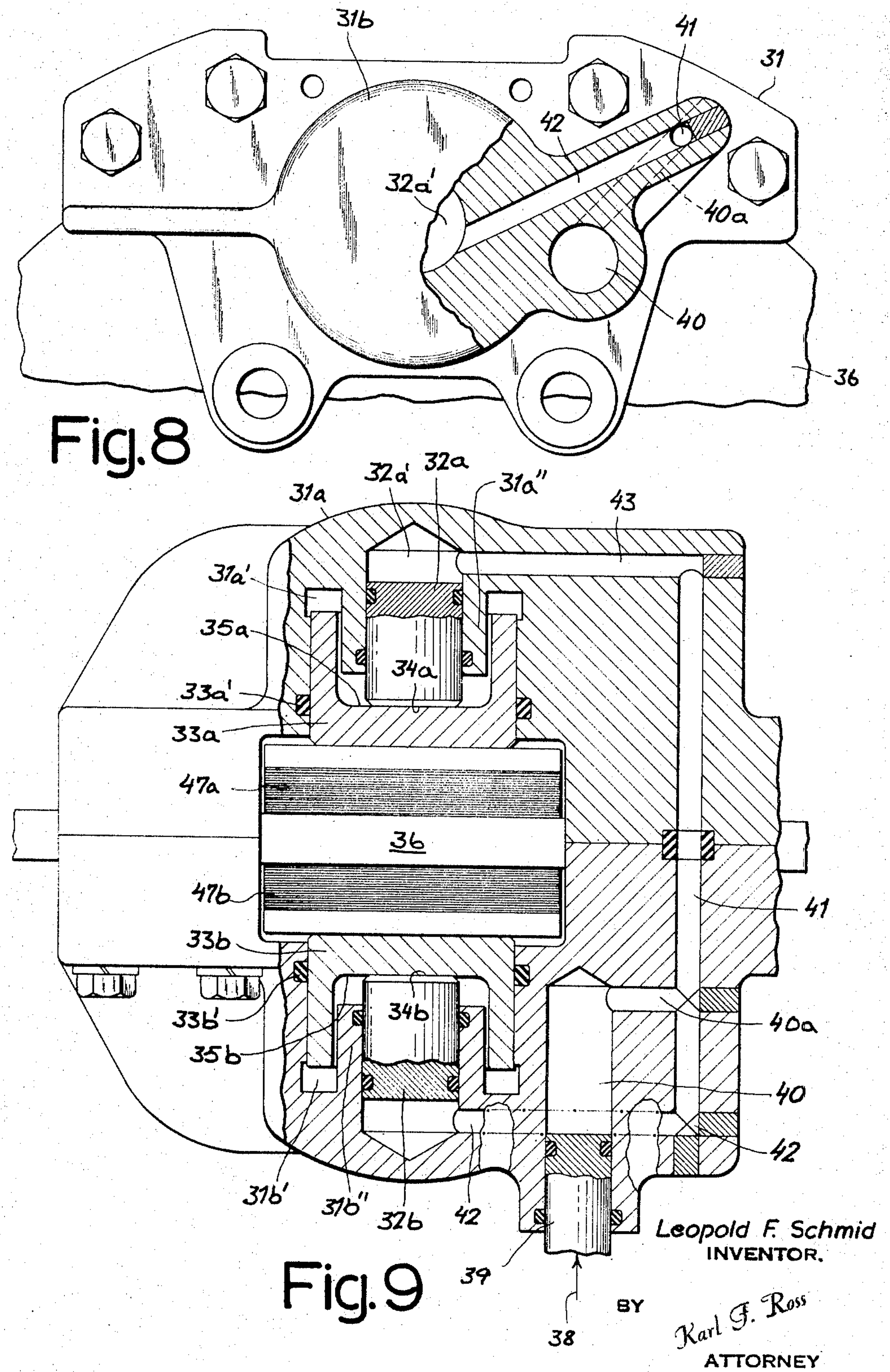
FIG. 8 is an elevational view, partly broken away in a third embodiment.
FIG. 9 is a plan view, partly broken away, of this latter brake.

FIGS. 8 and 9 represent still another embodiment of this invention wherein the yoke 31 has a pair of main brake cylinders 31*a* and 31*b* having cylinder bores 31*a'* and 31*b'* which receive brake fluid from the master cylinder in the usual manner and independently of the actuation of the auxiliary brake. The main pistons 33*a* and 33*b* are axially shiftable within these cylinders and cooperate with seals 33*a'* and 33*b'* thereof. In this embodiment, only a single pair of brakeshoes 47*a* and 47*b* are provided for engagement with the disk 36 when the main pistons 33*a*, 33*b* are hydraulically displaced in the direction of the disk by depression of the brake pedal. The auxiliary actuating means here comprises a plunger 39 which can be displaced in the direction of arrow 38 by a Bowden-cable arrangement of the type described in connection with FIGS. 5–7 to force brake fluid from the bore 40 via passage 40*a*, 41 and 42 into an auxiliary cylinder bore 32*b'* coaxially aligned with the cylinder 31*b'* and the main piston 33*b*. The latter is cup-shaped and opens away from the disk 36 to receive a boss 31*b''* forming the cylinder 32*b'*. The auxiliary piston 32*b* is axially shiftable within the cylinder 32*b'* under the fluid pressure delivered to the latter by the plunger 39. The latter concurrently delivers fluid to the auxiliary cylinder 32*a'* via the passage 40*a*, 41 and 43. Cylinder 32*a'* is formed in a boss 31*a''* and slidably receives the auxiliary piston 32 while the main piston 33*a* is shiftable in cylinder 31*a'* to apply the brakeshoe 47*a* against the disk. When the brake pedal is actuated, therefore, hydraulic fluid is applied to the annular surface 35*a* and 35*b* to urge the brakeshoes 47*a* and 47*b* against the disk 36. When the plunger 39 is shifted to apply the auxiliary brake, the auxiliary pistons 32*a* and 32*b* bear against the surfaces 34*a* and 34*b* of the main pistons which are thus shifted with the brakeshoes 47*a* and 47*b* in the direction of the disk. Surfaces 35*a* and 35*b* of the main pistons which are thus shifted with the brakeshoes 47*a* and 47*b* in the direction of the disk. Surfaces 35*a* and 35*b* of the main pistons thus are effective independently of the auxiliary brake system.

The invention described and illustrated is believed to admit of many modifications within the ability of persons skilled in the art.

I claim:

1. In a disk-brake system for an automotive vehicle in which a brake housing is disposed along the periphery of a rotatable brake disk and has a pair of main brakeshoes juxtaposed with annular braking faces of the disk and adapted to be applied thereagainst by hydraulic means, the combination therewith of an auxiliary brake-actuating mechanism which comprises a pair of auxiliary cylinders formed in said housing and hydraulically interconnected for fluid transfer of force between them; a pair of auxiliary pistons slidably received in the respective auxiliary cylinders for movement toward and away from said disk, a first of said auxiliary pistons being constructed and arranged to apply a first brakeshoe against said disk upon augmentation of fluid pressure in said auxiliary cylinders; and a driver-controlled mechanically displaceable actuating member mounted in said housing independently of the operation of said hydraulic means and shiftable therein for increasing the fluid pressure in said auxiliary cylinders.

2. The combination defined in claim 1 wherein said first brakeshoe is one of said main brakeshoes.

3. The combination defined in claim 1 wherein a pair of auxiliary brakeshoes is mounted in said housing for engagement with opposite sides of said disk adjacent said main brakeshoes, said one of said auxiliary pistons bearing against one of said auxiliary brakeshoes, the auxiliary cylinder of the other of said auxiliary pistons being offset from the auxiliary cylinder of said one of said auxiliary pistons, said housing being provided with a passage parallel to said disk and interconnecting said auxiliary cylinders, said actuating member being formed as a rod shiftable in said housing parallel to the axes of said auxiliary cylinders and bearing upon said other auxiliary piston for displacing same to force fluid into the auxiliary cylinder of said one of said auxiliary pistons, said mechanism further comprising a pin shiftable in said housing parallel to said rod and bearing upon the other of said auxiliary brakeshoes, a bridge member concurrently engaging said pin and said rod, and a Bowden line operatively connected with said bridge for displacing same.

4. The combination defined in claim 1 wherein said mechanism comprises a pair of auxiliary brakeshoes mounted in said housing on opposite sides of said disk for displacement toward and away from the latter, said auxiliary cylinders being aligned with said auxiliary brakeshoes on opposite sides of said disks, said housing being formed with a passage extending athwart said disk and connecting said auxiliary piston, and a cylinder bore communicating with said passage, said actuating member being formed as a plunger shiftable in said bore for displacing fluid into said cylinder.

5. The combination defined in claim 1 wherein said auxiliary pistons displace said main brakeshoes against said disk.

6. The combination defined in claim 1 wherein the second of said auxiliary pistons is operatively coupled with a second brakeshoe for applying same to said disk on the side thereof opposite said first brakeshoe and is effective upon operation of said actuating member.

7. The combination defined in claim 6 wherein said mechanism includes a Bowden cable for displacing said actuating member.

8. The combination defined in claim 6 wherein said actuating member forms at least part of a plunger adapted to force fluid into the auxiliary cylinder of said first piston.

9. The combination defined in claim 8 wherein each of said pistons acts upon a respective brakeshoe on a respective side of said disk, said housing being provided with a passage extending athwart the disk and interconnecting said auxiliary cylinders behind the respective auxiliary pistons with respect to the brakeshoes displaced thereby, said housing having a compartment communicating with said passage and receiving said plunger.

10. The combination defined in claim 9 wherein said compartment has an axis parallel to the axis of said auxiliary cylinders and perpendicular to the braking faces of said disk, said plunger being shiftable in said compartment perpendicularly to said braking faces of said disk.

11. The combination defined in claim 10 wherein said compartment is a bore in said housing parallel to but offset from said auxiliary cylinders.

12. The combination defined in claim 10 wherein said compartment is a bore coaxially aligned with and communicating with one of said auxiliary cylinders.

13. The combination defined in claim 6 wherein the second of said auxiliary pistons is coupled with said second brakeshoe by a force-transmitting bridging said actuating member and said other brakeshoe, said actuating member bearing upon said second auxiliary piston to displace fluid from its auxiliary cylinder to the auxiliary cylinder of said first auxiliary piston.

14. The combination defined in claim 13 wherein said actuating member is a rod shiftable parallel to said auxiliary pistons and said brakeshoes, said mechanism further comprising another rod slidably mounted in said housing and shiftable parallel to said pistons and bearing upon said other auxiliary piston, said force-transmitting member constituting a bridge acting concurrently against both said rods.

References Cited

UNITED STATES PATENTS

| | | | |
|---|---|---|---|
| 3,103,990 | 9/1963 | Wilkinson | 188—73 |
| 3,145,807 | 8/1964 | Desvignes et al. | 188—73 |
| 3,285,371 | 11/1966 | Cadiou | 188—73 |
| 3,371,749 | 3/1968 | Lucien et al. | |

GEORGE E. A. HALVOSA, *Primary Examiner.*

U.S. Cl. X.R.

188—73, 152